T 860,003

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED MARCH 18, 1969

860 O.G. 677

762,160

PROCESS FOR DRY SPINNING POLY(4-METHYL-1-PENTENE)

Howard A. Aiken, Kennett Square, and George C. Oppenlander, Embreeville, Pa., assignors to Hercules Incorporated, Wilmington, Del., a corporation of Delaware

Continuation-in-part of abandoned application Ser. No. 375,923, June 17, 1964. This application Sept. 24, 1968. Published Mar. 18, 1969

Class 264—210

No Drawing. 11 Pages Specification

Fibers of high molecular weight poly(4-methyl-1-pentene) have long been desired because of the high melting point of the polymer (above 230° C.). However, both melt and solution spinning have resulted in severe polymer degradation and the fiber so produced had poor physical properties.

The process of this application makes it possible to spin poly(4-methyl-1-pentene) into fibers having a reduced specific viscosity (RSV) greater than 5 as measured on a 0.1% solution in decahydronaphthalene at 135° C. The following steps are carried out:

(1) charging to an extruder a slurry containing 40–60% by weight of a poly(4-methyl-1-pentene), having an RSV greater than 5, in a liquid hydrocarbon diluent (preferably having a boiling point of 175 to 300° C.), (2) heating said slurry in the extruder to 200–285° C., (3) extruding a filament, (4) passing the filament through solvent removal means, and (5) orienting the filament by stretching from 250 to 1300%.

The slurry that is charged can be the solvent wet filter cake obtained from the polymerizer, to which additional diluent is added if necessary to give at least 40% diluent, or it can be made from dry polymer flake by mixing it with 40–60% diluent. The oriented fiber exhibits excellent physical properties including high temperature strength retention and good abrasion resistance.